Nov. 11, 1941.                A. DREYER                2,262,423
                     WELDING METHOD AND APPARATUS
                        Filed April 17, 1939           2 Sheets-Sheet 1
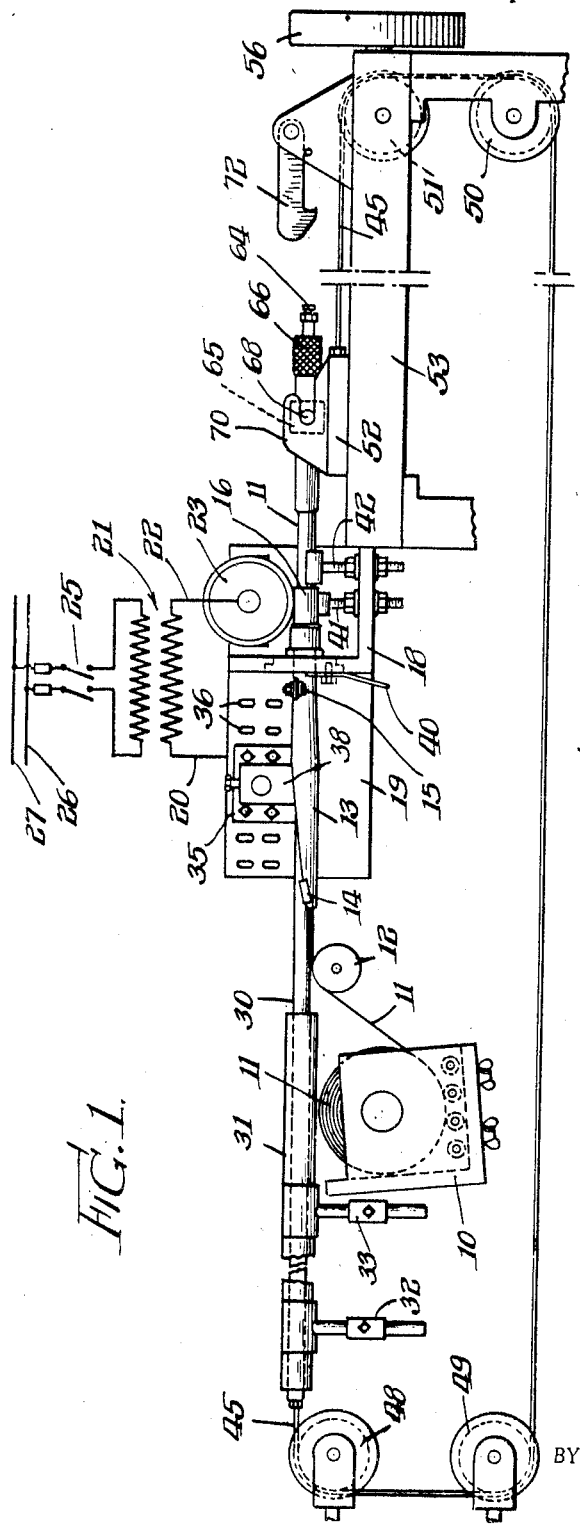
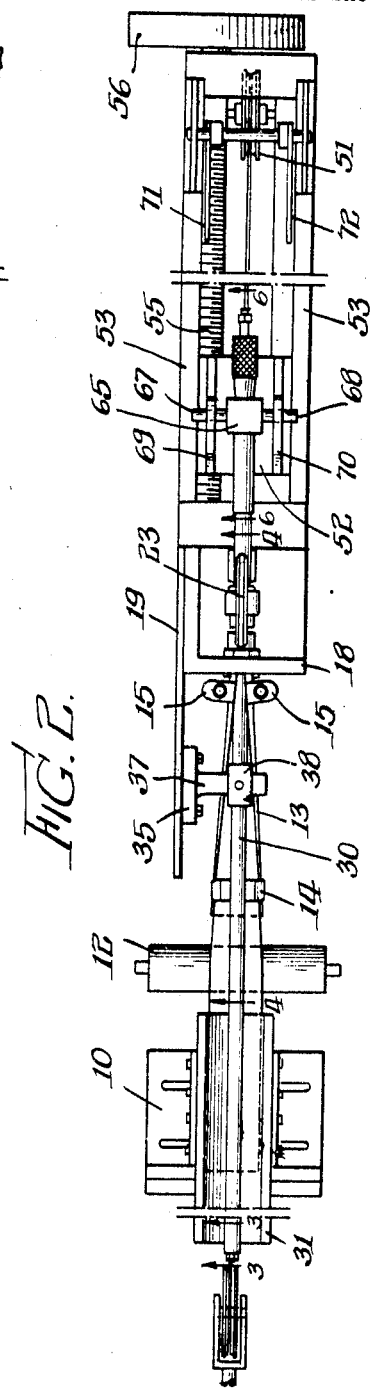
INVENTOR.
Albert Dreyer
BY: Cox & Moore
ATTORNEYS.

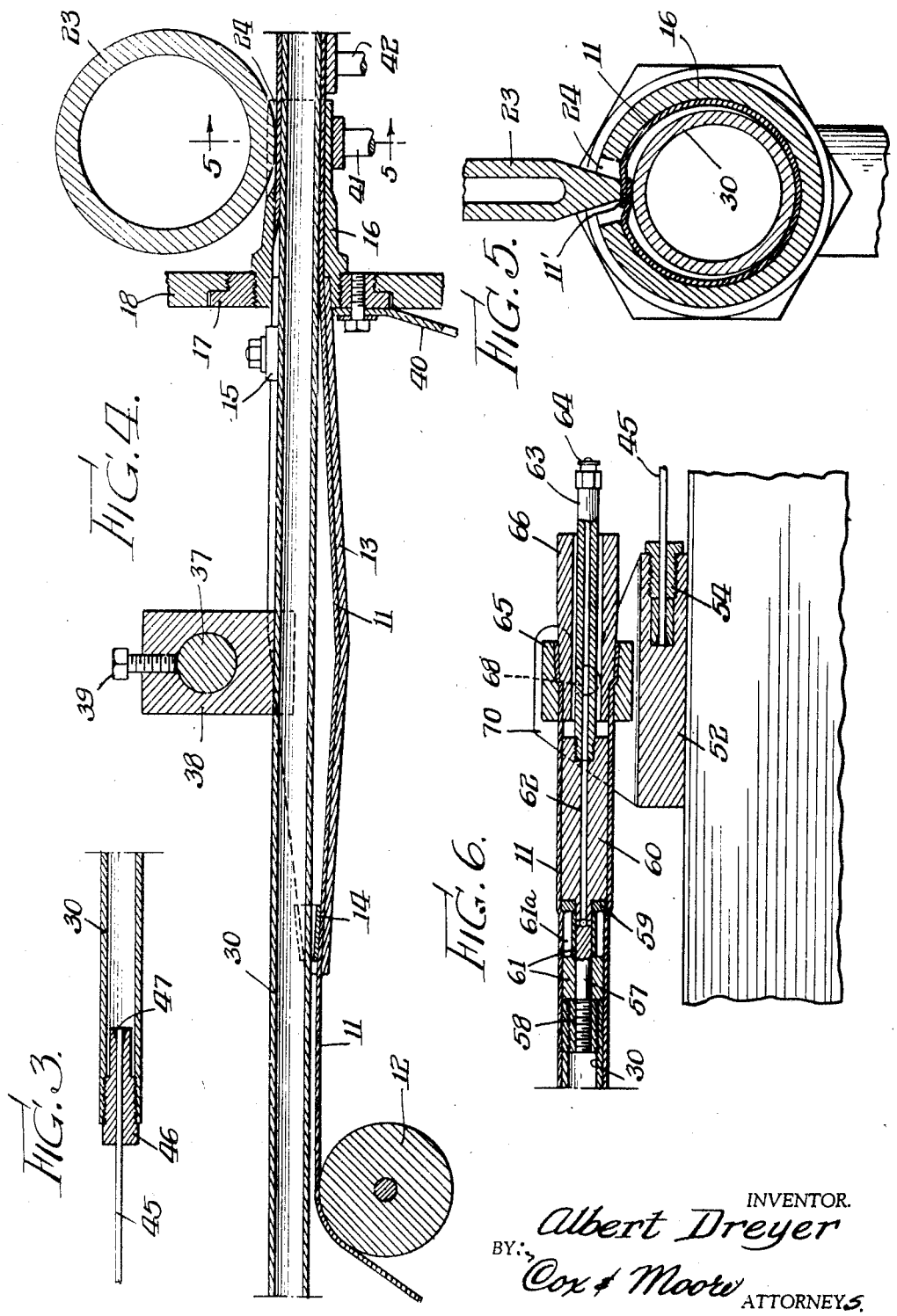

Patented Nov. 11, 1941

2,262,423

UNITED STATES PATENT OFFICE 2,262,423

WELDING METHOD AND APPARATUS

Albert Dreyer, Lucerne, Switzerland, assignor to Chicago Metal Hose Corporation, Maywood, Ill., a corporation of Illinois Application April 17, 1939, Serial No. 268,239 In Switzerland June 13, 1938

19 Claims. (Cl. 29—33)

This invention relates to welding methods and apparatus, and more particularly to the welding of tubing or the like.

It is an object of the invention to provide a welding method and apparatus for welding materials by the electrical resistance welding method which have improved operating characteristics and which provide continuously operable methods and means for welding materials on a production scale with a minimum of maintenance and repair.

A further object of the invention is to provide continuously operable welding methods and means which may be satisfactorily and economically utilized in the production of tubing or the like from elongated metal strip material, and more particularly in the production of such tubing of any desired length or size and of very thin wall structure.

Another object of the invention is to provide in welding methods and apparatus of the type above defined an improved form of electrode construction which moves with the material or tubing to be welded whereby to minimize wear and deterioration of the electrode. In accordance with the invention, the electrical current is applied to this electrode in close proximity to the welding station whereby to minimize electrode heating and facilitate the transmission of the welding current to the welding station.

A still further object of the invention is to provide in connection with the welding of metal tubing, improved means and methods for calibrating and straightening the tubing after the welding operation.

Other objects are to provide means whereby electrodes of relatively inexpensive material may be used avoiding the necessity of using special alloy materials, and to provide in the welding of tubing or the like, means whereby the tubing will be held positively and accurately in position at the welding station avoiding the necessity of preliminary spot welding or other securing devices.

Still other objects and advantages of the invention will appear from the following specification when taken in connection with the accompanying drawings wherein a preferred embodiment is illustrated.

In the drawings, wherein like reference numerals refer to like parts throughout:

Fig. 1 is a general assembly side view, in part diagrammatically shown, of one preferred form of welding apparatus embodying the principles of the invention.

Fig. 2 is a top view of the apparatus shown in Fig. 1.

Fig. 3 is a detail view, on an enlarged scale, taken on the line 3—3 of Fig. 2, illustrating the means for securing one end of the movable electrode to its operating means.

Fig. 4 is a longitudinal sectional view, on an enlarged scale, of the tubing forming and welding mechanism, taken on the line 4—4 of Fig. 2.

Fig. 5 is a transverse sectional view of the welding mechanism at the welding station, taken on the line 5—5 of Fig. 4, and Fig. 6 is a longitudinal sectional view, on an enlarged scale, of the tube straightening and calibrating means, taken on the line 6—6 of Fig. 2.

The apparatus shown comprises mechanism for continuously forming longitudinally welded tubing from metal strip material, as the invention and the principles thereof are primarily adapted for use with apparatus of this character. However, it is to be understood that certain features of the invention may be used with apparatus of other kinds and for other purposes.

Referring specifically to the drawings, and first to Figs. 1 and 2 thereof, it will be seen that the apparatus illustrated comprises a holder 10 adapted to support a roll of strip metal 11 from which the tubing is to be formed. The metal strip is led from the holder over a guide roller 12 into a tube forming die 13. This die is in the form of an elongated trough. The leading end of the trough into which the strip material is fed, shown to the left in Figs. 1, 2 and 4, is relatively flat, and is provided with a cross piece 14 for insuring that the strip material 11 will be properly fed into the forming die and held therein. The die member 13 is progressively shaped into the form of a trough from its leading to its trailing end. The sides of the trough are made of progressively increasing height and are then closed together at the top, so that the trailing end of the die, shown to the right in Figs. 1, 2 and 4, has a closed substantially circular form. The forming member is provided adjacent its trailing end with a pair of guide pieces 15 having their adjacent ends projecting beyond the edges of the forming member whereby to engage the edges of the strip 11 and hold it in proper position.

As best shown in Fig. 4, the trailing end of the die 13 terminates into the cylindrical bore of a bushing member 16 threaded into a holder or plug member 17 which is in turn secured to a main bracket or support 18. The bracket 18 is secured to and electrically connected with a support plate 19 which is electrically connected to one branch 20 of the welding transformer diagrammatically indicated at 21. The other branch 22 of the welding transformer is connected to an electrode wheel 23 rotatably supported adjacent the bracket 18, but electrically insulated therefrom. The wheel 23 is adapted to engage the strip or tube to be welded through an opening 24 in the bushing 16, as best shown in Figs. 4 and 5. The welding transformer may be controlled from a switch 25 suitably connected to power lines 26 and 27.

A movable electrode 30 in the form of an elongated tube lies within the forming trough 13 in such position that the tubing strip 11 will be wrapped around it as it is formed into tubing shape, the diameter of the electrode being slightly less than that of the tubing to be formed, as may be best seen in Fig. 5. The trailing end of the electrode 30, shown to the left in Figs. 1 and 2, is adapted to be supported by a support table 31 which, as will be best seen from Fig. 2, is sufficiently wide to support electrodes of various sizes as may be used in the welding of different sizes of tubing. The support 31 is adjustable as to height by means of the adjustable supporting legs 32 and 33.

Means is provided for feeding electrical current to the electrode 30 from the support plate 19. To this end the support plate 19 carries a bracket 35, the bracket being adjustable longitudinally of the plate. The plate is provided with a series of longitudinally disposed openings 36, the supporting means for the bracket being adapted to engage within any of these openings as may be desired. The bracket is provided with a shaft portion 37 adapted to carry an electrode engaging shoe 38, the shoe being adjustably secured to shaft 37 by means of set screw 39. As best shown in Figs. 2 and 4, the shoe 38 slidably engages electrode 30 through the top of the forming die 13 and the partially formed tubing strip. The lower portion of the shoe 38 is provided with a contour the same as the electrode so as to provide a maximum surface of contact between the parts. As shown in Fig. 1, openings 36 in the plate 19 are elongated vertically to permit the vertical adjustment of the bracket 35 and the engaging shoe 38.

The plug member 17 pivotally carries an adjustment lever 40, the upper end of which lever is bifurcated and engages the opposite sides of the forming die 13. The lever 40 may be adjustably pivoted to move the trailing edge of the forming die thus insuring that the lapped edges 11', Fig. 5, of the tubing strip will be properly positioned in alignment with the electrode wheel 23. The support bracket 18 also carries an adjustable supporting member 41 for supporting the bushing 16, and a second adjustable support 42 adapted to slidably engage the welded tube.

Means is provided for moving the inner electrode 30 forwardly or to the right as seen in Fig. 1 with the tube strip during the forming and welding operations, and for returning the electrode after the completion of these operations, during which means provided on the end of the electrode calibrates and straightens the finished, welded tube. The left hand end of the electrode is adapted to be secured to a cable 45 by means of any suitable connection such, for example, as is shown in Fig. 3. This connection may comprise a plug member 46 soldered or welded to the cable as indicated at 47 and threaded into the end of the electrode tube. The cable leads over a set of wheels 48, 49, 50 and 51, the opposite end of the cable being secured to a sled member 52 arranged for sliding movement along a frame 53. As shown in Fig. 6, the cable may be secured to the sled by means of a threaded plug 54 similar to the securing plug 46 previously described. The sled is adapted to be moved along the frame 53 by means of a lead screw 55 with which it is in threaded engagement, the lead screw being rotatable by means of an operating wheel 56.

The right hand end of the electrode 30 is provided with tube straightening and calibrating means, Fig. 6, comprising a member 57 threaded into a sleeve 58 which is in turn threaded into the end of the electrode. Member 57 has a relatively narrow calibrating disk 59 mounted thereon, the outside diameter of the disk corresponding to the desired inside diameter of the welded tubing. Member 57 is also provided with a tube straightening extension 60 which is of slightly smaller diameter and adapted to follow the calibrating disk and straighten the tube after it has been calibrated to size. The calibrating disk is narrow to reduce friction. These calibrating and straightening operations occur as the electrode 30 is moved to the left relative to the completed welded tube 11, as will subsequently be described. A pair of sleeves 61 also embrace the member 57 to form a reservoir 61a for lubricant or the like, adjacent the calibrating disk 59. Lubricant may be fed to this reservoir from a lubricant channel 62 formed in the straightening block 60. Channel 62 terminates in a coupling connection 63 threaded to block 60 which may carry standard grease gun fittings 64.

The end of the welded tube is adapted to be locked to a pair of tapered plugs 65 and 66, the tapers on these plugs being complementary so that as the plug 66 is driven into the plug 65, the end of the welded tube will be securely held in position. Plug 66 is provided with a bore through which the coupling 63 projects. As seen in Fig. 2, the plug 65 is provided with oppositely projecting shafts 67 and 68. These shafts are adapted to engage respectively with notches formed in ears 69 and 70 provided on the opposite sides of the sled 52. Accordingly, as the sled is drawn to the right by means of the lead screw 55, the welded tube and also the electrode 30 will be pulled forwardly or to the right at corresponding speed.

When the sled reaches its extreme movement to the right, shafts 67 and 68 will be automatically engaged and held by pivoted latch members 71 and 72 which are fixed to the frame 53. If the lead screw 55 is now reversely rotated, the sled 52 will be returned to the left. This movement of the sled causes the cable 45 to pull the electrode 30 to the left while the tube itself is held from movement by plugs 65 and 66 which are anchored to the latches 71 and 72. Accordingly the tube calibrating and straightening means will be drawn outwardly through the tube by the electrode 30, calibrating and straightening the welded tube.

In the operation of the machine, switch 25 is closed and the lead screw 55 is operated to pull sled 52 to the right to effect the welding operation. This causes the metal strip 11 to be withdrawn from the supply roll in holder 10, over guide roll 12, and through the forming die 13 and bushing 16 wherein it is shaped into tubing form with its upper edges overlapping as shown in Fig. 5. As the tubing is drawn past the welding station, it is engaged by the outer welding roller 23 which is rotated on its fixed axis, thus rolling along the outer surface of the lapped tubing joint. The welding current passes through the joint to be welded between the roller electrode 23 and the inner electrode 30, the inner electrode being in electrical communication with the plate 19 through the shoe member 38 and its associated bracket assembly. The electrode 30 is drawn to the right with the tubing so that there is no sliding movement between the inner electrode and the tubing. When the sled 52 reaches its extreme movement to the right, shafts 67 and 68 will be gripped by the latches 71 and 72 thus holding the welded tubing against reverse movement. As the lead screw is now reversely rotated, moving the sled 52 to the left, the electrode 30 is drawn outwardly from the tubing causing the calibration and straightening of the tubing by members 59 and 60 as previously described. The completed tubing section is then cut off and the new tubing end secured to the plugs 65 and 66, the end of the tubing being split to permit insertion of plug 66, if desired. During the welding process, the welding station may be subjected to the action of cooling water as is usual in electrical resistance welding.

It will be seen that the welding apparatus provides means and methods for the continuous welding of longitudinally seamed tubing from strip material by electrical resistance welding. Tubes of any length or size may be formed and welded, the distance of travel of the sled 52 and the length of the inner electrode 30 being proportioned to accommodate the necessary length of tubing required. By selecting the proper size of the inner electrode 30, and the size of the other tubing engaging parts, tubes of various sizes can be formed and welded, including very small sizes. Also, very thin walled tubing can be made due to the fact that the inner electrode 30 supports the welded joint during the welding process. Due to the fact that the lapped joint to be welded is accurately positioned by the forming die 13 and bushing 16, with the adjustment means 40, no special holding appliances at the welding station are required, and an accurate weld may be secured without preliminary spot welding to position the welded parts, even though tubing of very thin wall structure is to be made. The calibrating and the straightening of the tubing is automatically effected as an incident to the welding operation by the withdrawal of the electrode 30. As the tubing is straightened and calibrated, any stresses set up in the tubing by the welding operation are also relieved.

The use of the elongated inner electrode 30, which moves with the tubing during the welding operation, avoids difficulties heretofore encountered in welding tubing by known methods, as for example where inner roller electrodes or the like are employed. The electrode 30 is sufficiently strong to withstand the welding pressure imparted by the wheel 23, which pressure in some cases must be material to secure the proper fusing of the metal as well as the reduction of the thickness of the lapped joint to approximately the wall thickness of the remaining parts of the tube. The shaft electrode does not move relative to the tubing during the welding operation, thus eliminating friction. It has no relatively movable parts requiring lubricant which may mix with the cooling water and injure the quality of the weld. Wear of the electrode is eliminated or reduced to an absolute minimum. Even if ordinary non-alloy metals are used no noticeable wear occurs, and thousands of feet of tubing may be satisfactorily welded without repair or replacement of the electrode. In this connection it is to be noted that as the electrode 30 is drawn back and forth during successive welding operations, the cable 45, which may be of the stranded type, causes a slight rotation of the electrode whereby to continuously present new welding surfaces. Also, during each welding operation a new and cool surface on the electrode 30 is continuously presented beneath the roller 23, thus further reducing electrode wear.

It is further to be noted that the shoe 38, by which current is applied to the electrode 30, is close to the welding station. This reduces the necessary path of travel of the current through the electrode to a minimum, avoiding the heating and resultant wear of the electrode. Also, this arrangement permits the use of very small electrodes such as will be necessary in the making of small sizes of tubing. In the larger sizes, a tubular electrode, as illustrated, may be used. In smaller sizes, a solid bar electrode may be necessary to afford the necessary current capacity. In any event, the electrode will always be slightly smaller than the inside diameter of the finished tube, whereby to permit ready withdrawal of the electrode while furnishing adequate support to the tube wall during welding. The electrode may be from ½ to 1½ mm. smaller than the tube. The path of current travel from the shoe 38 to the welding station is always of the same length. The current applied through the inner electrode to the welding station will thus always be constant and not variable, thus precluding variations in the quality of the weld.

As indicated above, the electrode 30 may be merely copper or bronze tubing or other metal of good electrical conductivity. In the larger sizes it is preferably in tubular form to reduce the weight. The bracket 18, bushing 16, and supports 41 and 42 may also be of copper or electrically conductive metal, thus forming further sources of current supply to the inner electrode. These sources, however, are only secondary sources of supply, as this current must pass through the tubing 11 in which the metal is not highly conductive. The primary supply source comprising the shoe 38 insures adequate current supply and a good weld.

The welding roller 23 may be spring pressed into engagement with the welded joint at any desired pressure. This force is absorbed by the supports 41 and 42 which may be properly adjusted to absorb the forces in any desired ratio.

The foregoing apparatus may be successfully used to weld tubing 50 yards or more in length. It may also be successfully used to weld stainless steel tubing, including extremely thin walled tubing. By changing the contour of the inner electrode 30 and the other tubing engaging parts, tubing of oval contour or of other desired contour may be produced.

It is obvious that various changes may be made in the specific embodiment of the invention set forth for purposes of illustration without departing from the spirit thereof. The invention is accordingly not to be limited to the specific embodiment heretofore illustrated and described, but only as indicated in the following claims.

The invention is hereby claimed as follows:

1. The method of welding a metal assembly by electrical resistance welding which comprises engaging one side of the assembly against a translatable electrode, engaging the other side of the assembly against a rotatable electrode, and moving the assembly and the translatable electrode together as a unit past the rotatable electrode while passing current between the electrodes whereby to weld said assembly.

2. The method of welding a tube comprising arranging an elongated electrode in the tube, engaging the outer surface of the tube to be welded against a second electrode, and moving the tube and the elongated electrode together as a unit and the second electrode relative to each other while passing current between electrodes whereby to weld the tubing.

3. The method of forming a tube from strip material which comprises shaping an elongated strip into tubular form with edges in juxtaposed relation by folding it around an elongated electrode body, engaging the outer surface of said edges against a rotatable electrode, and moving the formed tubing and the elongated electrode as a unit and the rotatable electrode relative to each other while passing current between the electrodes whereby to weld said edges.

4. The method of forming a tube from strip material which comprises shaping an elongated strip into tubular form with edges in juxtaposed relation by folding it around an elongated electrode body, engaging the outer surface of said edges against a rotatable electrode, moving the formed tubing and the elongated electrode as a unit past the rotatable electrode while passing current between the electrodes whereby to weld said edges, and thereafter straightening and calibrating the welded tubing to size.

5. A welding apparatus comprising a fixed electrode, a movable electrode, said movable electrode being adapted to form a support for the material to be welded, and means for moving the movable electrode with the material supported thereon past the fixed electrode while passing current between the electrodes whereby to weld said material.

6. A welding apparatus as defined in claim 5 wherein said fixed electrode is a roller mounted upon a fixed axis of rotation.

7. A tube welding apparatus comprising a fixed electrode, an elongated movable electrode adapted to be arranged within the tube to be welded, said tube and said movable electrode being adapted to be moved together as a unit past the fixed electrode while passing current between the electrodes whereby to effect the welding operation.

8. A tube welding apparatus as defined in claim 7 wherein the fixed electrode is a roller mounted upon a fixed axis of rotation.

9. A tube forming apparatus comprising means for forming an elongated metal strip into tubular form having adjacent edges to be welded, a rotatable electrode, an elongated translatable electrode adapted to be arranged within said formed tubing, said tubing and said elongated translatable electrode being adapted to be moved together as a unit past the fixed electrode while passing current between the electrodes whereby to weld said edges and complete the tubing.

10. A tube forming apparatus comprising means for continuously shaping a metal strip into tubular form having adjacent edges to be welded, an elongated electrode adapted to be arranged within said tubing, a fixed electrode disposed adjacent the discharge end of the shaping means, means for moving the inner electrode and the tubing together as a unit past the fixed electrode while passing electric current between the electrodes whereby to weld said edges, and means located adjacent said shaping means for supplying electrical current to said elongated electrode.

11. A tube welding apparatus comprising a first electrode, an elongated electrode adapted to be arranged within the tube to be welded, and means for moving the elongated electrode and the tubing as a unit and the first electrode relative to each other while passing current between the electrodes whereby to weld the tube, and tube calibrating means associated with the elongated electrode adapted to calibrate the tube on withdrawal of said elongated electrode from the tubing.

12. A tube forming apparatus comprising means for continuously shaping a metal strip into tubular form with adjacent edges to be welded, a rotatable electrode, a translatable electrode adapted to be arranged within the shaped tubing, means for moving said translatable electrode and said tubing together as a unit past the rotatable electrode while passing current between the electrodes whereby to weld said tubing edges, and means for calibrating said tubing operable as the translatable electrode is withdrawn from the welded tubing.

13. A tube forming apparatus comprising means for continuously shaping a metal strip into tubular form with adjacent edges to be welded, welding means including a fixed electrode for welding said edges, and means for adjusting the position of said shaping means with respect to the position of the welding means whereby to insure the proper positioning of said edges at the welding means.

14. A tube welding apparatus comprising a wheel electrode mounted upon a fixed axis of rotation, an elongated movable electrode adapted to be arranged within the tubing to be welded, means for moving the tubing and the movable electrode as a unit past the wheel electrode while passing current between the electrodes whereby to weld said tubing, and a fixture through which the tubing passes at the welding station, said fixture being provided with an opening through which a portion of the wheel electrode projects into engagement with the tubing.

15. A tube forming apparatus comprising means for continuously shaping a metal strip into tubular form, with adjacent edges to be welded, a wheel electrode mounted upon a fixed axis of rotation, an elongated movable electrode adapted to be arranged within the tubing, means for moving said movable electrode and said tubing as a unit past the wheel electrode while passing current between the electrodes whereby to weld said tubing edges, and a fixture through which the tubing passes at the welding station, said fixture being provided with an opening through which a portion of said wheel electrode is adapted to project into engagement with said tubing edges.

16. A tube welding apparatus comprising a fixed electrode, an elongated movable electrode adapted to be arranged within the tube to be welded, means for moving the movable electrode and the tubing past the fixed electrode as a unit while passing current between the electrodes whereby to weld the tube, and tube calibrating and straightening means operable upon withdrawal of the movable electrode from the tubing for calibrating and straightening the tubing, said calibrating and straightening means comprising means secured to the end of the movable electrode.

17. A tube welding apparatus comprising a fixed electrode, an elongated movable electrode adapted to be arranged within the tube to be welded, means for moving the movable electrode and the tubing past the fixed electrode as a unit while passing current between the electrodes whereby to weld the tube, tube calibrating and straightening means operable upon withdrawal of the movable electrode from the tubing for calibrating and straightening the tubing, said calibrating and straightening means comprising means secured to the end of the movable electrode, and means comprising a lubricant reservoir adjacent the calibrating and straightening means for supplying lubricant thereto.

18. A tube welding apparatus comprising a first electrode, an elongated electrode adapted to be arranged within the tube to be welded, means for moving the elongated electrode and the tube as a unit and the first electrode relative to each other while passing current between the electrodes to effect the welding operation, and means for withdrawing the elongated electrode from the tubing, said last named means being operable to rotate the elongated electrode upon its own axis whereby to present new welding surfaces for cooperation with the first electrode.

19. A tube welding apparatus comprising a first electrode, an elongated electrode adapted to be arranged within the tube to be welded, means for moving the elongated electrode and the tubing as a unit and the first electrode relative to each other while passing current between the electrodes whereby to weld the tube, and tube calibrating means associated with the elongated electrode adapted to calibrate the tube on withdrawal of said elongated electrode from the tubing, said tube calibrating means comprising a relatively narrow calibrating disk and an elongated tube straightening extension associated therewith and adapted to be operable upon the tube after the calibrating disk has calibrated it to size.

ALBERT DREYER.

CERTIFICATE OF CORRECTION.

Patent No. 2,262,423.  November 11, 1941.

ALBERT DREYER.

It is hereby certified that error appears in the printed specification of the above numbered patent requiring correction as follows: Page 4, second column, line 3, claim 10, for "inner" read --elongated--; and that the said Letters Patent should be read with this correction therein that the same may conform to the record of the case in the Patent Office.

Signed and sealed this 24th day of March, A. D. 1942.

(Seal)

Henry Van Arsdale,
Acting Commissioner of Patents.